J. AND H. TRUST.
FOOD MACHINE.
APPLICATION FILED SEPT. 18, 1919.
1,422,391.
Patented July 11, 1922.
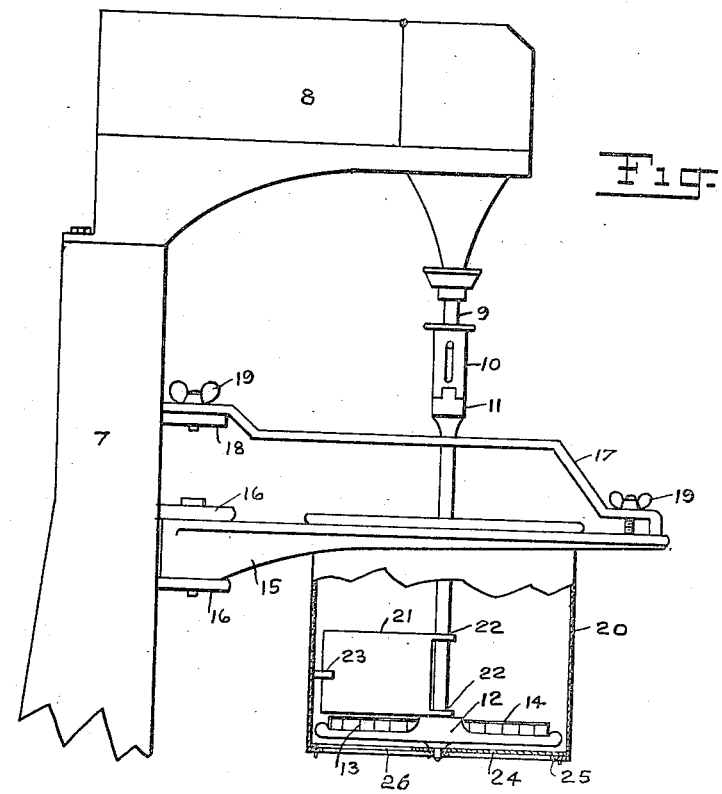
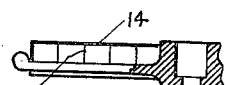
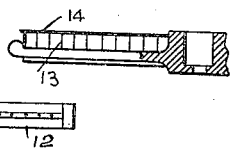
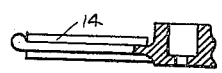
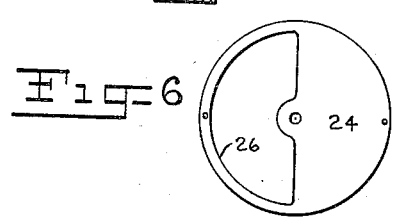
INVENTORS
Josephine Trust.
Henry Trust.
BY
ATTORNEY

UNITED STATES PATENT OFFICE.

JOSEPHINE TRUST AND HENRY TRUST, OF PARK RIDGE, NEW JERSEY, ASSIGNOR, BY MESNE ASSIGNMENTS, TO METEOR MIXING MACHINE CO., INC., A CORPORATION OF NEW YORK.

FOOD MACHINE.

1,422,391.   Specification of Letters Patent.   Patented July 11, 1922.

Application filed September 18, 1919. Serial No. 324,603.

*To all whom it may concern:*

Be it known that we, JOSEPHINE TRUST and HENRY TRUST, citizens of the United States, residing at Park Ridge, in the county of Bergen and State of New Jersey, have invented certain new and useful Improvements in Food Machines, of which the following is a specification, reference being had therein to the accompanying drawing.

Our invention relates to improvements in food machines and has particular reference to a machine adapted for cutting cubes of potato for soups, French fries, etc.

Referring to the accompanying drawing, we have illustrated in Fig. 1 in side elevation partly in cross section and parts being broken away a suitable type of machine embodying an application of our invention. Fig. 2 is a detailed view partly broken away and partly cross section illustrating a form of cutter for forming potato cubes for soups and the like.

Fig. 3 is a similar view of a similar cutter for cutting smaller cubes. Fig. 4 is a similar view of a form of cutter for cutting French fried potatoes and for slicing cabbage and the like and Fig. 5 is a similar view for cutting larger pieces. Fig. 6 is a plan view of the disc secured in the bottom of the container in which the food is operated upon.

7 indicates the standard of the machine and 8 the transmission box from which the spindle 9 is driven. 10 indicates the chuck in the lower end of which is secured tool spindle 11 upon the bottom of which is secured the cutter 12 which is provided with wires or thin knife-like members 13 and a transverse wire or knife-like member 14 for cutting cubes of vegetable or other food such as potatoes.

15 indicates a suitable bracket secured in the lugs 16 as shown, and 17 indicates another bracket also suitably secured in the lug such as 18 shown, and provided at its outer extremity with suitable fastening means such as 19 for securing the same to the bracket 15, thus providing a suitable bearing for the spindle 11 of the tool while at the same time providing support for the pail 20.

21 indicates a suitable leaf or partition through which the spindle 11 loosely passes as indicated at 22 and 23 indicates a suitable lug within the pail 20 to prevent said leaf or partition from revolving with said spindle. 24 indicates a suitable disc seated upon the flange 25 in the bottom of the pail 20, said disc being cut away as indicated at 26 to allow for the passage of the cut food.

In operation assuming that potatoes are to be used, a few of them are dropped into the pail and the tool rotating rightwardly, throws them against the partition 21 where the weight of the potato resting upon the disc 24 is cut by the cutters 13—14, the cubes therefrom dropping through the opening 26. For small pieces, a small cutter such as shown by Fig. 3 may be employed or for larger pieces, the cutter shown in Fig. 2. For slicing potatoes, cabbage or other material, cutters such as shown in Fig. 5 may be employed in which the vertical cutters 13 are omitted but the operation of the machine is otherwise substantially the same.

Of course it will be understood that various modifications may be made in the construction and arrangement of parts without departing from the spirit of the invention as claimed.

We claim:

In a machine of the class described, a receptacle provided with an opening in the bottom, a cutting tool adapted to rotate therein and a partition adjacent thereto for preventing the rotation of food therewith, said tool provided with upper knife-like members extending radially and lower knife-like members extending axially.

In testimony whereof we hereunto affix our signatures in the presence of two witnesses.

JOSEPHINE TRUST.
HENRY TRUST.

Witnesses:
MADELINE C. FOERST,
DAVID H. DOUGLASS.